United States Patent [19]
Howard

[11] Patent Number: 5,126,664
[45] Date of Patent: Jun. 30, 1992

[54] WIRE COMPOSITION FOR A SMALL DIAMETER TEMPERATURE STABLE PROXIMITY COIL

[75] Inventor: Jack E. Howard, Gardnerville, Nev.

[73] Assignee: Bently Nevada Corporation, Minden, Nev.

[21] Appl. No.: 629,369

[22] Filed: Dec. 18, 1990

[51] Int. Cl.[5] .................. G01B 7/14; G01N 27/72; G01R 33/00
[52] U.S. Cl. .................. 324/207.12; 324/207.16; 324/207.25; 324/225
[58] Field of Search .................. 324/207.16, 207.25, 324/224, 225, 207.12

[56] References Cited

U.S. PATENT DOCUMENTS 4,517,156  5/1985  Masumoto et al. .................. 420/463
4,563,643  1/1986  Leschek et al. .................. 324/207.16

Primary Examiner—Walter E. Snow
Attorney, Agent, or Firm—Flehr, Hohbach, Test, Albritton & Herbert

[57] ABSTRACT

A small diameter proximity coil for use in proximity sensors to sense imbalance in rotating machinery which has a coil of less than 0.3 inch diameter is constructed of a silver/palladium alloy of 89% silver and 11% palladium. This provides for, because of the inherent balancing out of AC and DC resistance changes, temperature errors of less than 10% over a wide temperature range of operation.

2 Claims, 1 Drawing Sheet

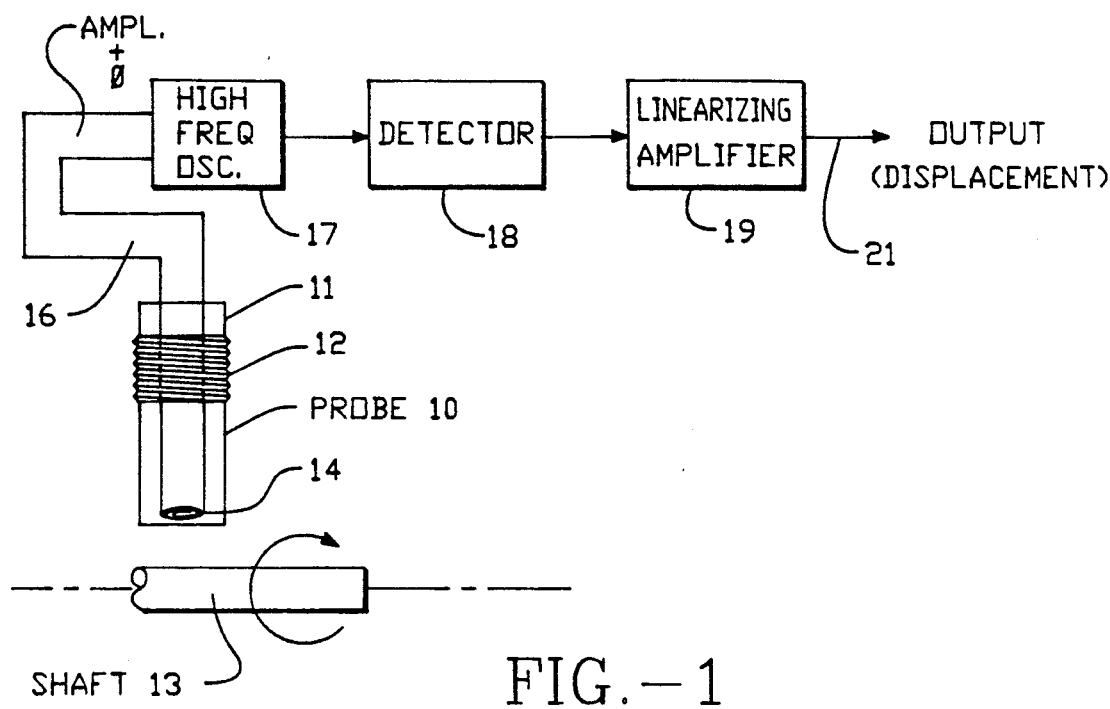
FIG.—1
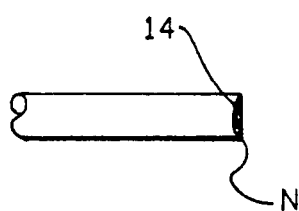
FIG.—2A
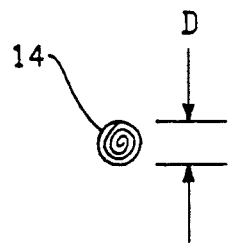
FIG.—2B
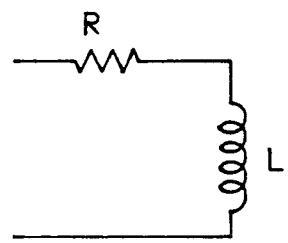
FIG.—3

WIRE COMPOSITION FOR A SMALL DIAMETER TEMPERATURE STABLE PROXIMITY COIL

The present invention is directed in general to a small diameter temperature stable proximity coil, and more specifically, a coil used in conjunction with rotating machinery to sense its vibrations.

BACKGROUND OF THE INVENTION

As disclosed in U S. patent application Ser. No. 318,133 filed Mar. 2, 1989 in the name of Mark Schutts, assigned to the present assignee, and now U.S. Pat. No. 5,021,737, proximity sensors are used in conjunction with rotating machinery to sense imbalances like position change of, for example, a shaft. Such sensor includes adjacent to the shaft a sensing coil and at the other end a cable connected to an electrical processing unit. Such processing unit, which normally will include an oscillator, senses the movement or displacement of the rotating machinery by a change in amplitude of the oscillating signal. Any change in amplitude is primarily because of a change in the inductance and resistance of the coil which is affected by the displacement or vibration of the rotating machinery.

Because of space restrictions for the proximity sensor and its coil, the coil should have a diameter less than 0.3 inches. At the same time since the coil is subject to a temperature range of $-34°$ C. to $+177°$ C. it should have a relatively low temperature coefficient of electrical resistance. Also, since a relatively high operating frequency, for example, 1 megahertz, is used, the specific electrical resistance should be low and yet have sufficient inductance. Too high a resistance or too low an inductance will prevent the oscillator from functioning.

One wire material which was used for a probe coil was 100% silver wire which had a temperature coefficient of 3800 PPM/° C. at a resistivity of 9.8 ohms per cir.mil foot. For this type of Wire, it Was known that the AC resistance changed contrarily in an opposite mode to the DC resistance so that by selecting an optimum operating frequency, the error caused by temperature changes could be somewhat canceled out. However this still might have amounted to 45% error.

Another material which has been used commercially is a copper alloy wire with 98% copper and 2% nickel. This material had a temperature coefficient of 1400 PPM/° C. and resistivity of 30 ohms per cir. mil foot. This had an error of about 30%. This material while suitable for some purposes had at higher operating temperatures undesirable characteristics.

If coil diameter is not a problem, then materials with higher resistivity and small temperature coefficients, can be used. One type is a copper nickel alloy with 55% copper and 45% nickel having a temperature coefficient of 20 PPM/° C. and a resistivity of 300 ohms per cir. mil foot. Another type, as shown in U.S. Pat. No. 4,517,156, is a palladium /silver alloy With about 60% palladium and 40% silver. This wire has a coefficient of 20 PMM/° C. and a resistivity of 240 ohms per cir. mil foot. Such higher resistivity wires are not suitable for small diameter coils. Small diameter, high resistivity wires would result in too high a resistance to allow the oscillator to function properly. Large diameter, high resistivity wires wound on a small diameter coil would not allow sufficient inductance to allow the oscillator to function properly.

OBJECT AND SUMMARY OF INVENTION

It is a general object of the present invention to provide a proximity sensor With a coil suitable for small diameter use yet having relatively low temperature errors.

In accordance with the above object, there is provided a proximity sensor having a case with a coil at one end for use in proximity for rotating machinery with a cable extending out of the ether end and connected to an electrical processing unit and which includes an oscillator operating at a radio frequency. The coil has an effective inductance and resistance affected by the rotating machinery which proportionately changes the amplitude of the oscillator signal. The coil comprises a metal alloy consisting substantially of 89% silver and 11% palladium by weight.

BRIEF DESCRIPTION OF DRAWINGS

FIG. 1 is a block diagram showing a proximity sensor incorporating the present invention.

FIGS. 2A and 2B are side and end views of the coil of the present invention.

FIG. 3 is an equivalent electrical schematic of the coil of the present invention.

DESCRIPTION OF PREFERRED EMBODIMENT

FIG. 1 illustrates a proximity sensor or probe 10 having a casing 11 with threads 12 for installation in proximity to a rotating shaft 13. At the end of probe 10 opposite the shaft 17 is a coil 14, electrically connected to a cable 16 extending out of casing 11. The cable has a signal on it whose amplitude and phase changes proportionately, with the proximity of the shaft 13 to coil 14 due to changes in the coil's inductance and resistance. Cable 16 is connected to a high frequency oscillator 17 whose amplitude of oscillation is affected by the inductance and resistance of coil 14. The output signal of oscillator 17 can be detected by the detector 18 and amplified by linearizing amplifier 19 to provide on line 21 an output proportional to the displacement of the shaft 13. The foregoing is generally shown in the above '156 patent.

In accordance with the invention, the coil 14, as more specifically shown in FIGS. 2A and 2B, consists essentially of substantially 89% silver and 11% palladium by weight. This is available commercially under the Model name 411 Alloy, and has a resistance of substantially 37 ohms per cir. mil foot and a temperature coefficient of electrical resistance of 800±200 PPM/° C.

As shown in FIG. 2B, the wound diameter D of coil 14 is less than 0.3 inches which is the largest practical size for many installations (specifically the diameter D is 0.210 inches). With such diameter and an oscillator frequency of approximately 1 MHz, the number of turns, N is 132. With the use of a 36 gauge wire diameter and the above parameters, the AC and DC resistance with change of temperature (as discussed above) cancel out so that the overall temperature error for the present invention is approximately 10% over the above mentioned typical operating temperature range.

FIG. 3 is an equivalent circuit of the coil with resistance R and inductance L. The inductance L and resistance R of course change in response to shaft displacement or vibration. This changes the amplitude of oscillation which is the parameter which provides the final output signal. Resistance R represents both AC and DC resistance which respectively change in an opposite manner with change in temperature.

With the unique wire alloy of the present invention, a small diameter coil is possible with minimum temperature error. This is an improvement over the copper/nickel alloy of 98% copper and 2% nickel in that although the resistance is somewhat greater, the temperature coefficient of electrical resistance is almost half thus significantly reducing errors. Moreover, it is believed that the palladium/silver alloy has an improved characteristic of change in AC and DC resistance due to temperature where errors are more effectively canceled because of the inherent characteristic of this particular alloy. In any case it has been found experimentally that the error due to temperature change may be reduced to 10. It should be reiterated that although the palladium/silver alloy percentage of approximately 60% palladium and 40% silver as shown in '156 patent has a much lower coefficient °PPM/° C., its resistance makes it entirely unsuitable for the present use. Thus an improved small diameter proximity coil has been provided.

What is claimed is:

1. In a proximity sensor having a case with a coil at one end for use in proximity to rotating machinery with a cable extending out the other end of said coil connected to an electrical processing unit including an oscillator operating at a radio frequency, said coil having an effective inductance and resistance affected by said rotating machinery which proportionately changes the amplitude of such oscillator signal, said coil comprising:

a metal alloy consisting essentially of substantially 89% silver and 11% palladium by weight for providing a coil with a number of turns with a desired said inductance to operate at said radio frequency but with a small coil diameter of less than 0.3 inches.

2. A sensor as in claim 1 where said metal alloy has a resistance of substantially 37 ohms/circular mil foot and a temperature coefficient of electrical resistance of 800±200 PPM/° C.

* * * * *